United States Patent
Ramesh et al.

(10) Patent No.: US 8,306,003 B2
(45) Date of Patent: Nov. 6, 2012

(54) THROUGHPUT PERFORMANCE IN THE PRESENCE OF IN-BAND INTERFERENCE IN A CSMA BASED NETWORK

(75) Inventors: Sridhar Ramesh, Bangalore (IN);
Arvind Venkatadri, Bangalore (IN);
Divyesh Kumar Shah, Bangalore (IN);
Mayank Jain, New Delhi (IN);
Vijayvithal Someracharya Jahagirdar, Bangalore (IN); Sarma Gunturi, Bangalore (IN); Indu Prathapan, Kodungallur (IN)

(73) Assignee: Texas Instruments Incorporated, Dallas, TX (US)

(*) Notice: Subject to any disclaimer, the term of this patent is extended or adjusted under 35 U.S.C. 154(b) by 1428 days.

(21) Appl. No.: 11/309,938

(22) Filed: Nov. 7, 2006

(65) Prior Publication Data

US 2007/0133489 A1 Jun. 14, 2007

Related U.S. Application Data

(60) Provisional application No. 60/735,002, filed on Nov. 9, 2005.

(51) Int. Cl.
*H04W 4/00* (2009.01)

(52) U.S. Cl. .... 370/338; 370/350; 455/63.1; 455/114.2; 455/278.1; 455/296; 455/1

(58) Field of Classification Search ................ 370/338, 370/350; 455/63.1, 114.2, 278.1, 296, 1; 375/346

See application file for complete search history.

(56) References Cited

U.S. PATENT DOCUMENTS

| 7,408,907 | B2* | 8/2008 | Diener | 370/338 |
| 2004/0047324 | A1* | 3/2004 | Diener | 370/338 |
| 2004/0235439 | A1* | 11/2004 | Husted et al. | 455/136 |
| 2005/0100119 | A1* | 5/2005 | Husted et al. | 375/346 |
| 2005/0152314 | A1* | 7/2005 | Sun et al. | 370/334 |
| 2006/0025127 | A1* | 2/2006 | Cromer et al. | 455/432.1 |

* cited by examiner

*Primary Examiner* — Kamran Afshar
*Assistant Examiner* — Khalid Shaheed
(74) *Attorney, Agent, or Firm* — Steven A. Shaw; W. James Brady; Frederick J. Telecky, Jr.

(57) ABSTRACT

A wireless device in a wireless network transmits a data frame even in the presence of in-band interference (from transmission of other devices) on a shared channel provided in the wireless network. In an embodiment, configuration data is provided to the wireless device indicating whether frames be transmitted (stomped) or not in the presence of such inband interference. If the configuration data indicates that the wireless device transmit in the presence of in-band interference, the wireless device transmits a frame if the transmitter of the interfering communication is determined to be from a different basic service set (BSS).

12 Claims, 9 Drawing Sheets

THROUGHPUT PERFORMANCE IN THE PRESENCE OF IN-BAND INTERFERENCE IN A CSMA BASED NETWORK

RELATED APPLICATION

The present application claims priority from U.S. provisional patent application Ser. No. 60/735,002 filed on Nov. 09, 2005, naming as inventors Ramesh et al, entitled, "Methods of Improving WLAN transmit performance in in-band Interference", and is incorporated in its entirety herewith.

BACKGROUND

1. Field of the Invention

The present invention relates generally to networks, and more specifically to improving the throughput performance of a CSMA (carrier sense multiple access) based network in the presence of in-band interference.

2. Related Art

Carrier sense multiple access (CSMA) based networks are often used to connect multiple electronic/computing devices. In general, in CSMA based networks, each device senses whether the shared medium provided by the network is available (not used by other devices), and transmits the desired signal when the medium is available. In some environments, the medium provides multiple channels and the availability of the channel may be checked instead. In the case of wireless technologies, a channel may be established using techniques/technologies such as carrier sense multiple access (CSMA/CA) as is well known in the relevant arts.

Inband interference is often present in networks. Inband interference refers to a situation in which another device is causing a signal strength on the channel of interest, typically by virtue of transmitting data to some other device (receiver). In one prior embodiment implemented in the context of CSMA/CA, a device first checks for the absence of interference, and starts transmission only when there is no interference. If interference is detected, the device waits for the interference to end, backoff for a random amount of time and then try to transmit. The throughput performance of the network may be accordingly reduced as a result.

Various aspects of the present invention improve the throughput performance of a CSMA based network in the presence of in-band interference, as described below.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

A device provided according to an aspect of the present invention transmits a frame even in the presence of in-band interference on a shared channel provided in a CSMA-based network. Due to such transmission, the throughput performance of the CSMA-based network may be enhanced.

In an embodiment, a configuration data is provided, with one value indicating that the frames can be transmitted even in the presence of inband interference, and another value indicating that the frames should not be transmitted in the presence of inband interference. Even when the configuration data indicates that the frames can be transmitted, additional conditions may be checked prior to transmission, as described below.

According to another aspect, the device determines the power level of the in-band interference, and refrains from transmission if the power level is above a pre-specified threshold. The device may further transmit a frame if the transmitter of the interfering communication is determined to be from a different basic service set (BSS).

In case the transmitter of the interfering communication is from the same BSS, the device may transmit the frames if the pair of devices, between which the interfering communication is taking place, are determined to be sufficiently farther away.

To facilitate determination of whether such pairs are sufficiently farther, a stomp table is maintained to indicate the farther pairs. Each entry in the stomp table indicates whether the corresponding transmissions between the corresponding pairs can be overridden (if farther) or not.

In one embodiment, the stomp table is populated based on the power levels with which the transmissions from each transmitting device is received. Alternatively or in addition, the device may send a frame even when the interference (of lower than the threshold as well from the same BSS) is detected to be present, and indicates in the stomp table that transmission may be continued in the presence of interference caused by the transmit-receive pair if an acknowledgment is received.

While the invention is described below in the context of WLAN (Wireless Local Area Network), various aspects of the inventions may also be implemented in the context of various other CSMA-based networks as well.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. Example Environment

Figure 1:
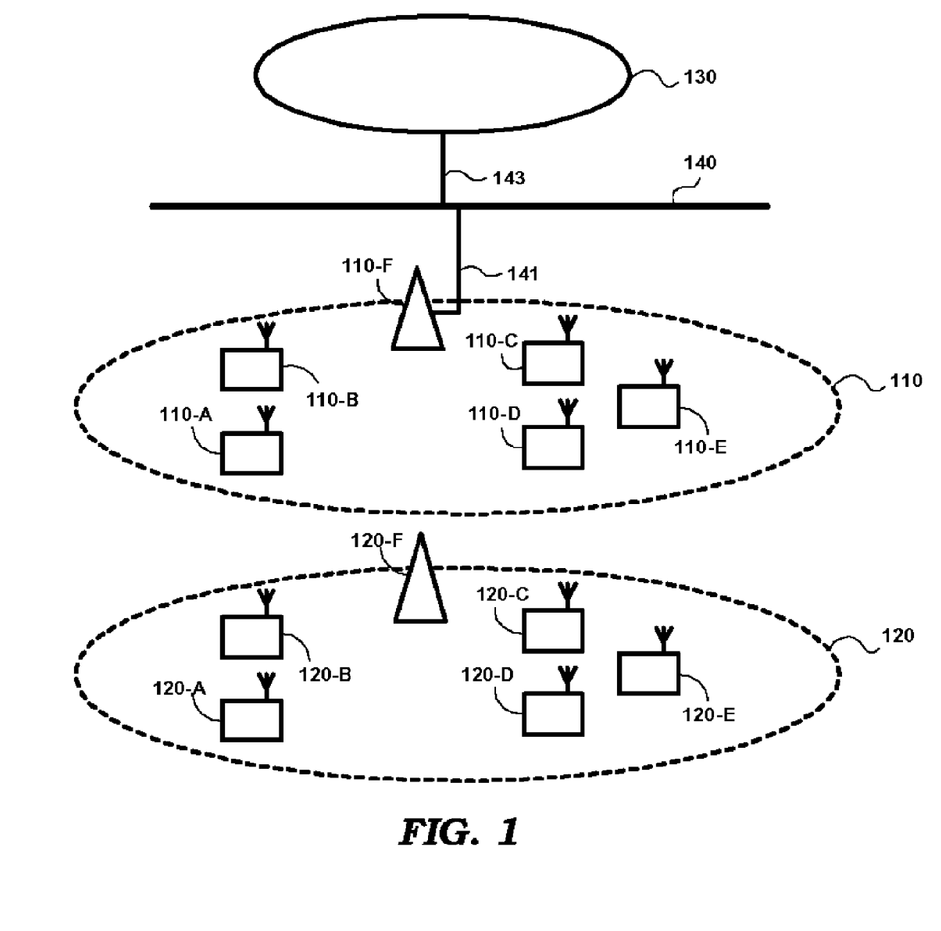
FIG. 1 is a diagram illustrating an example environment in which the various aspects of the present invention may be implemented.

FIG. 1 is a diagram illustrating an example environment in which the various aspects of the present invention may be implemented. The diagram is shown containing two Basic Service Sets (BSS) 110 and 120, wired network 130, and wired network backbone 140. Each component is described in detail below.

BSS 110 contains wireless devices (clients) 110-A through 110-E and access point (AP) 110-F. Each of wireless devices 110-A through 110-E may be any electronic/computing device (mobile or fixed) equipped with a wireless network interface card (or similar hardware) that enables wireless communication. Wireless devices 110-A through 110-E may be devices such as laptops, desktops, Personal Digital Assistants (PDA) etc. All devices in BSS 110 and BSS 120 may communicate with each other on a shared frequency band such as the 2.4 GHz (or 5.1 GHz) band specified by the WLAN standard.

AP 110-F is connected by a wired medium (141) to wired network backbone 140, which in turn is connected to wired network 130. AP 110-F provides wireless devices 110-A through 110-E connectivity with each other. Thus, for example, if wireless device 110-A is to communicate (transfer data to) with wireless device 110-C it may do so by first communicating with AP 110-F, which in turn communicates with wireless device 110-C. Thus, a wireless device 110-A/110-E wanting to communicate with another wireless device 110-A/110-E may do so via AP 110-F. AP 110-F also provides wireless devices 110-A through 110-E connectivity to wired network 130 and BSS 120. Each of wireless devices 110-A through 110-E in BSS 110 may also communicate with each other directly, independent of AP 110-F.

AP 110-F and each of wireless devices 110A through 110-E has the same BSS identification tag (BSSID). Consequently, communication between any of 110-A, 110-B, 110-C, 110-D, 100-E, and AP 110-F is identifiable by (the presence in frames/packets of) the BSSID of BSS 110.

BSS 120 and constituent components wireless devices 120-A through 120-E and AP 120-F operate in a manner similar to that described above with respect to BSS 110, and the related description is not repeated here for the sake of conciseness.

Wireless devices 110-A through 110-E and AP 110-F in BSS 110 may be designed to communicate with each other on a shared communication channel (referred to henceforth as channel for conciseness), which may be a designated frequency band, according to the CSMA-CA access technique described above.

In one prior embodiment, BSS 110 is constrained to allow only one of wireless devices 110-A through 110-E to transmit in a given time interval, while other wireless devices must wait till the channel is free. There may be a similar restriction with respect to BSS 120 also. It may be appreciated from the above description that the throughput performance (overall rate of transmission (and reception) of data) in BSS 110 and BSS 120 may be reduced because of the shared communication channel.

Various aspects of the present invention overcomes at least some of these restrictions and is described next in detail.

3. Enhancing Throughput Performance

Figure 2:
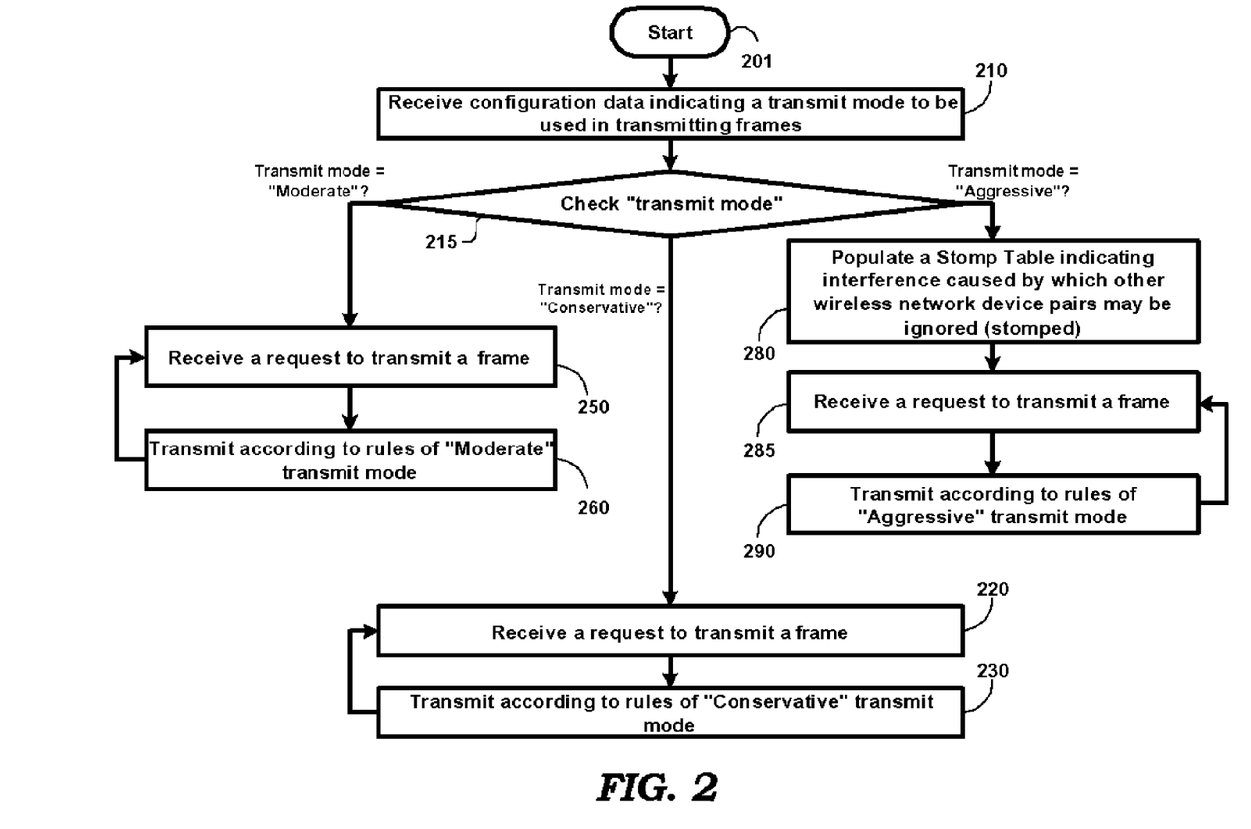
FIG. 2 is a flowchart illustrating the manner in which a device may be configured to operate in various modes to increase the throughput performance of a CSMA-based network according to various aspects of the present invention.

FIG. 2 is a flowchart illustrating the manner in which the throughput performance of a CSMA-based network can be enhanced according to various aspects of the present invention. Merely as an example, the various operations of the flowchart of FIG. 2 are described with respect to wireless device 110-A contained in BSS 110. However, the features may be implemented in other devices and access points in a CSMA-based network. The flowchart starts in step 201 where control passes immediately to step 210.

In step 210, wireless device 110-A receives configuration data indicating a transmit mode to be used in transmitting frames. The configuration data may be generated a priori based on user inputs and stored in a non-volatile memory. Control then passes to step 215.

In step 215, wireless device 110-A checks the transmit mode set in step 210. If transmit mode is set to "conservative" control goes to step 220. If transmit mode is set to "moderate" control goes to step 250. If transmit mode is set to "aggressive" control goes to step 280. The three modes are described in further detail with respect to FIGS. 3, 4, and 5 respectively.

Continuing with respect to FIG. 2, in step 220, wireless device 110-A receives a request to transmit a frame (for example, to wireless device 110-C). Such request may be generated internally in wireless device 110-A. Control then passes to step 230.

In step 230, wireless device 110-A transmits the frame to wireless device 110-C according to the rules of the "conservative" mode (described below in detail with respect to flowchart of FIG. 3). Control then passes to step 220 where wireless device 110-A receives another request to transmit a frame, and steps 220-230 are performed repeatedly.

In step 250, wireless device 110-A receives a request to transmit a frame (for example, to wireless device 110-C). Such request may be generated internally in wireless device 110-A. Control then passes to step 260.

In step 260, wireless device 110-A transmits the frame to wireless device 110-C according to the rules of the "moderate" mode (described below in detail with respect to flowchart of FIG. 4). Control then passes to step 250 where wireless device 110-A receives another request to transmit a frame, and steps 250-260 are performed repeatedly.

In step 280, a stomp table contained in wireless device 110-A is initialized indicating the interference from which pairs of other wireless devices assigned to the same network (BSS 110 in this example configuration) may be ignored (stomped). A user may initially enter in the stomp table the list of all known wireless devices that are assigned to BSS 110. If such information is not available, the presence of other wireless devices is learned and populated over time (in parallel to the operation of steps 285 and 290, described below), for example, as described in sections below.

It should be appreciated that device 110-A may adaptively operate in conservative, aggressive or moderate modes while the stomp table is being populated. In addition, while the frames are being transmitted in aggressive mode, the device may switch operation to conservative or moderate modes to facilitate learning of any changed information (e.g., mobile devices have moved). Control then passes to step 285.

In step 285, wireless device 110-A receives a request to transmit a frame (for example, to wireless device 110-C). Such request may be generated internally in wireless device 110-A. Control then passes to step 290.

In step 290, wireless device 110-A transmits the frame (for example, to wireless device 110-C) according to the rules of the "aggressive" mode (described below in detail with respect to flowchart of FIG. 5). Control then passes to step 285 where wireless device 110-A receives another request to transmit a frame, and steps 285-290 are performed repeatedly.

Merely for illustration, it is assumed that the configuration data determines the specific one of the three modes in which wireless device 110-A operates, and the mode continues for all subsequent transmissions. However, the transmission mode can be adaptively changed without departing from the scope and spirit of various aspects of the present invention.

The three modes "conservative", "moderate" and "aggressive" noted above are next described (in that order) with corresponding flowcharts.

4. Conservative Mode

Figure 3:
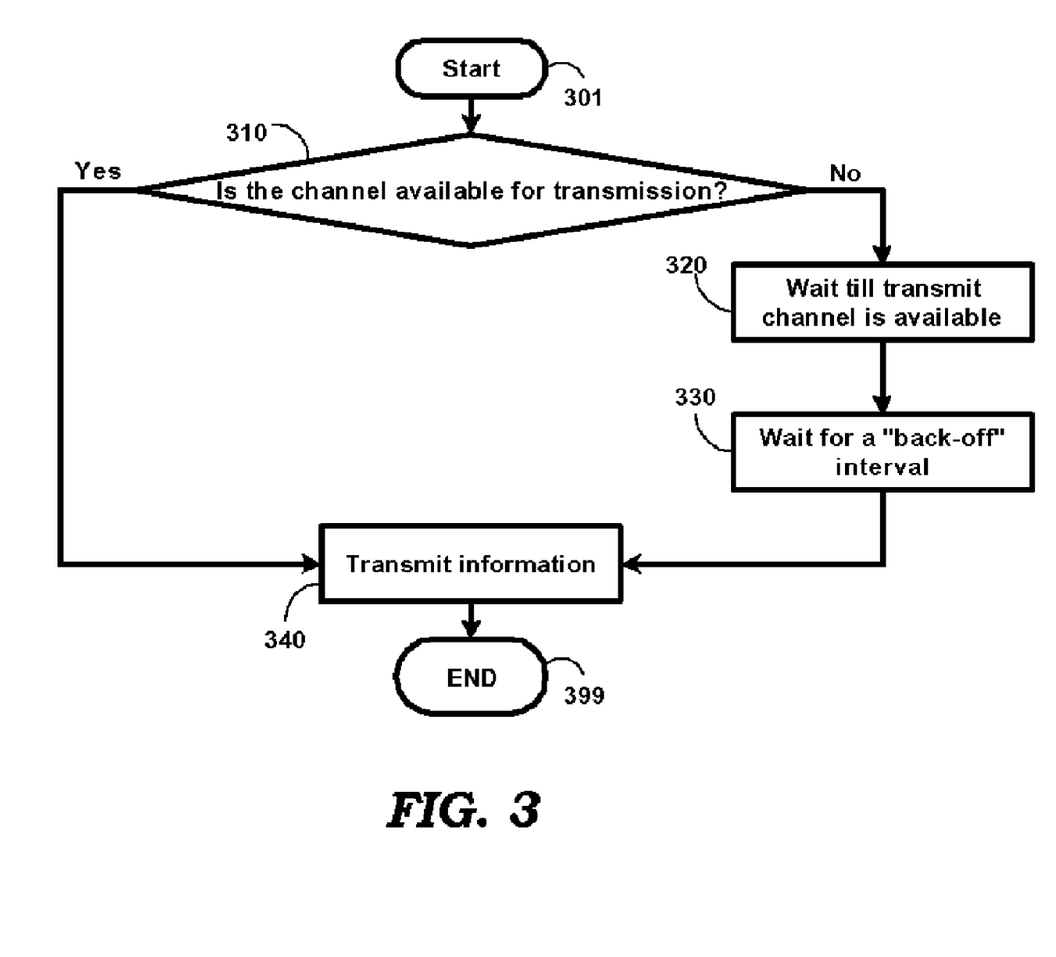
FIG. 3 is a flowchart illustrating the conservative mode of transmission in one embodiment.

FIG. 3 is a flowchart illustrating the conservative mode of transmission, and corresponds to step 230 of the flowchart of FIG. 2 in one embodiment. The flowchart is again described with respect to device 110-A merely for illustration. However, the flowchart can be implemented in other systems/environments without departing from the scope and spirit of various aspects of the present invention. The flowchart of FIG. 3 starts in step 301, in which control passes immediately to step 310.

In step 310, device 110-A determines if the shared communication channel is available for transmission. Such a determination may be made in a known way. If it is determined that the channel is free/available, control passes to step 340, else control passes to step 320.

In step 320, wireless device 110-A waits (i.e., continues to remain in step 320 without transmitting) till it is determined that the channel is free. When the channel is determined to be free, control passes to step 330.

In step 330, wireless device 110-A waits for a further random interval of time called a back-off interval. At the end of the "back-off" interval, control passes to step 340.

In step 340, wireless device 110-A transmits a frame to the intended recipient. The frame may contain the transmitter address (network address of wireless device 110-A in this example), the destination address, the BSSID of BSS 110, and may be formatted as described in the WLAN standard noted above. Control then passes to step 399 where the flowchart ends.

The procedure of the flowchart of FIG. 3 is thus, substantially the same as the normal channel access procedure according to the CSMA-CA technique. The moderate mode of operation is described next.

5. Moderate Mode

Figure 4:
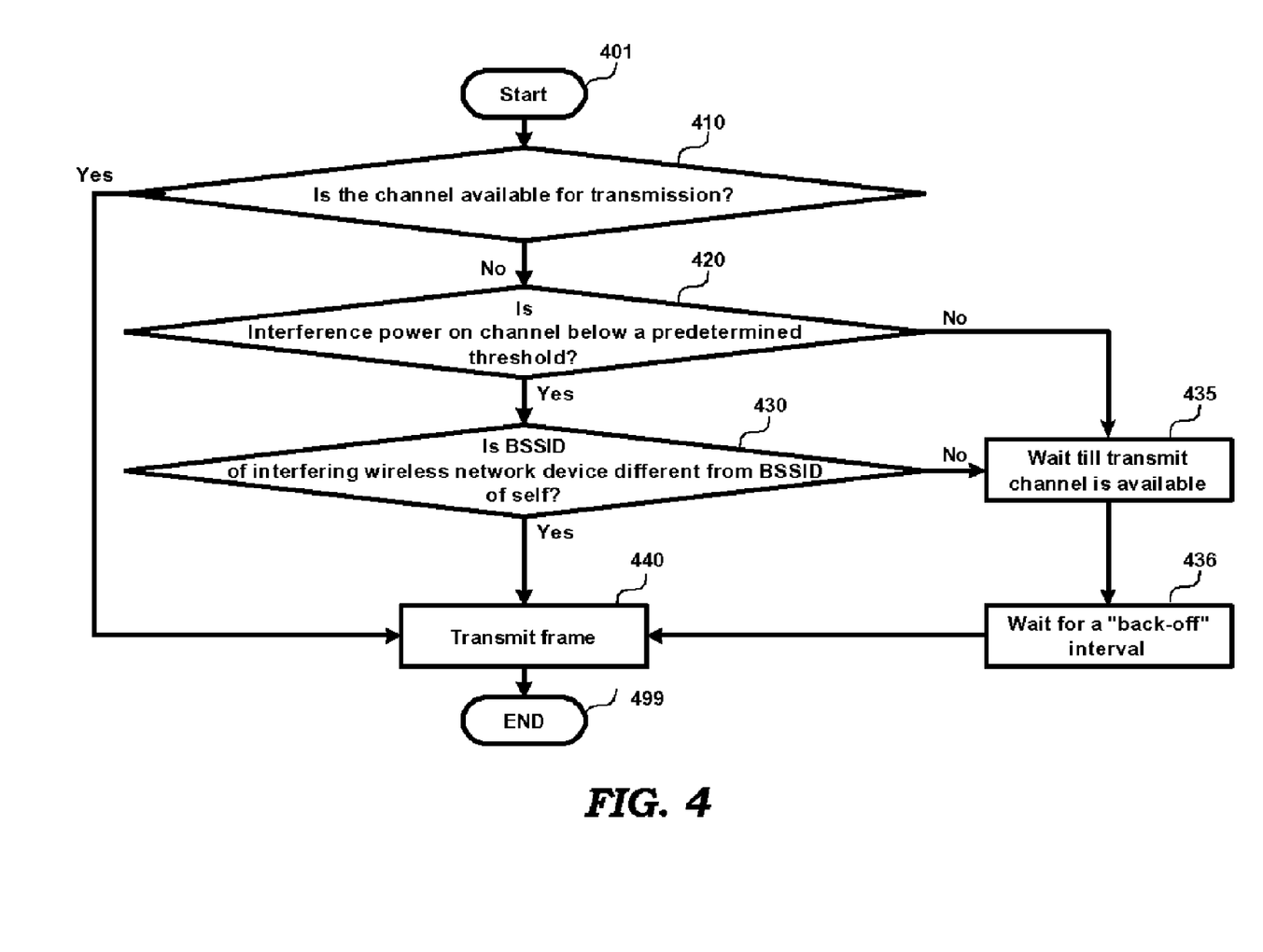
FIG. 4 is a flowchart illustrating the moderate mode of transmission in one embodiment.

FIG. 4 is a flowchart illustrating the moderate mode of transmission and corresponds to the detail of step 260 of the flowchart of FIG. 2 in one embodiment. The flowchart of FIG. 4 starts in step 401 where control passes immediately to step 410.

In step 410, it is determined if the shared communication channel is free, i.e., no other wireless device is transmitting in the channel. Such a determination may be made, for example, by listening in on the channel, as is well known in the relevant arts. If it is determined that the channel is free control passes to step 440, else control passes to step 420.

In step 420, the interference power on the channel is measured, and if it is determined that the interference power is below a predetermined threshold control passes to step 430, else control passes to step 435.

In step 430, the BSSID of the interfering device is noted. This may be done by reading the data contained in the interfering signal. As noted above, frames transmitted by a wireless device or an access point in a BSS contain the BSSID of that BSS. Thus, frames transmitted, for example, by 110-C (FIG. 2) will contain the BSSID of BSS 110, while frames transmitted, for example, by 120-E (FIG. 2) will contain the BSSID of BSS 120. If the BSSID of the interfering device is noted as being different from the BSSID of wireless device 110-A control passes to step 440, else control passes 435.

In step 435, wireless device 110-A waits (i.e., continues to remain in step 435 without transmitting) till it is determined that the channel is free. When the channel is determined to be free, control passes to step 436.

In step 436, wireless device 110-A waits for a further random interval of time called a back-off interval. At the end of the "back-off" interval, control passes to step 440. (Steps 435 and 436 are similar to steps 320 and 330 respectively of flowchart of FIG. 3)

In step 440, wireless device 110-A transmits a frame to the intended recipient device. The frame may contain the transmitter address (network address of wireless device 110-A in this example), the destination address, the BSSID of BSS 110, and may be formatted in a known way. Control then passes to step 499 where the flowchart ends.

Thus, in the moderate mode of operation, if it is determined that the in-band interference is being generated by a wireless device assigned to another BSS (for example, from wireless device 120-C), and if the interference power is below a predetermined threshold, then wireless device 110-A may ignore such in-band interference and transmit frames to the intended recipient (for example, wireless device 110-C).

As the interference level is minimal, the transmitted frame may be accurately decoded by the receiving device, thereby increasing the throughput performance of the CSMA-based network.

The aggressive mode of operation, which attempts to enhance the throughput performance further, is described next.

6. Aggressive Mode

Figure 5:
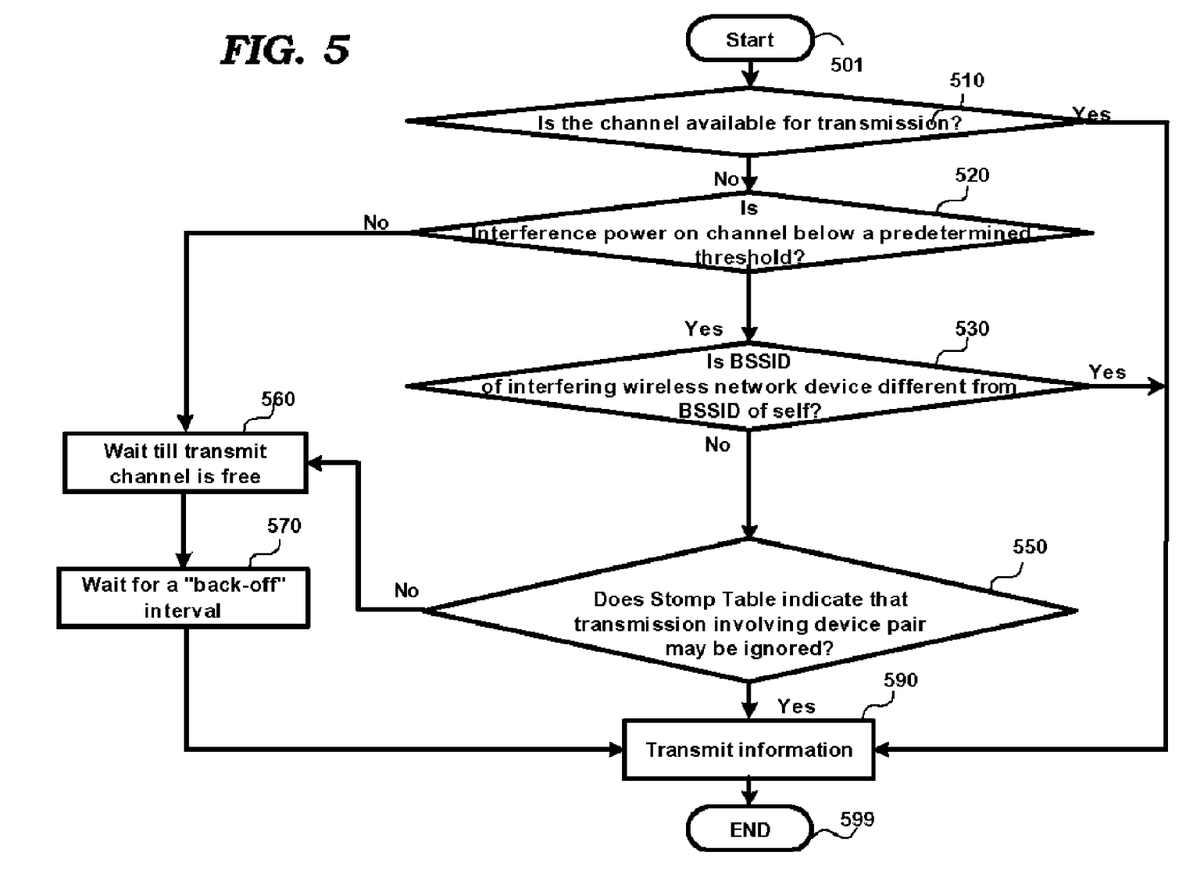
FIG. 5 is a flowchart illustrating the aggressive mode of transmission in one embodiment.

FIG. 5 is a flowchart illustrating the aggressive mode of transmission and corresponds to the detail of step 290 of the flowchart of FIG. 2 in one embodiment. The flowchart of FIG. 5 starts in step 501 where control passes immediately to step 510.

In step 510, it is determined if the shared communication channel is free, i.e., no other wireless device is transmitting in the channel. Such a determination may be made in a known way. If it is determined that the channel is free control passes to step 590, else control passes to step 520.

In step 520, the interference power on the channel is measured, and if it is determined that the interference power is below a predetermined threshold control passes to step 530, else control passes to step 560.

In step 530, the BSSID of the interfering device is noted. This may be done by reading the data contained in the interfering signal. As noted above, frames transmitted by a wireless device or an access point in a BSS contain the BSSID of that BSS. Thus, frames transmitted, for example, by 110-C (FIG. 2) will contain the BSSID of BSS 110, while frames transmitted, for example, by 120-E (FIG. 2) will contain the BSSID of BSS 120. In general, all the devices sharing the same BSSID are viewed as being in the same network. If the BSSID of the interfering device is noted as being different from the BSSID of wireless device 110-A (i.e., the devices are in different networks), control passes to step 590, else control passes 550.

In step 550, if the stomp table indicates that transmissions involving the device pair (transmitting wireless device and the corresponding receiving wireless device) may be ignored (or stomped) then control passes to step 590. If the stomp table indicates that transmissions involving the device pair may not be ignored, then control passes to step 560.

In step 560, wireless device 110-A waits (i.e., continues to remain in step 560 without transmitting) till it is determined that the channel is free. When the channel is determined to be free, control passes to step 570.

In step 570, wireless device 110-A waits for a further random interval of time called a back-off interval. At the end of the "back-off" interval, control passes to step 590. (Steps 560 and 570 are similar to steps 320 and 330 respectively of flowchart of FIG. 3).

In step 590, wireless device 110-A transmits a frame to the intended recipient. The frame may contain the transmitter address (network address of wireless device 110-A in this example), the destination address, the BSSID of BSS 110, and may be formatted in a known way, as described above. Control then passes to step 599 where the flowchart ends.

Thus, in the aggressive mode of operation, in addition to the possibility of transmitting in the presence of in-band interference (below a predetermined threshold) from another device assigned to a different BSS (steps 530/590), wireless device 110-A may transmit in the presence of in-band interference (stomping) if allowed by the corresponding entry in the stomp table (steps 530/550/590). Assuming the transmitted frames are accurately received by the recipient device, the throughput performance of the CSMA-based network is further enhanced.

As noted above, the information in the stomp table is used to determine when to override or stomp interference caused by a transmit-receive pair. The manner in which the stomp table is generated and updated, is described below in further detail.

7. Non-Intrusive Learning

Figure 6A:
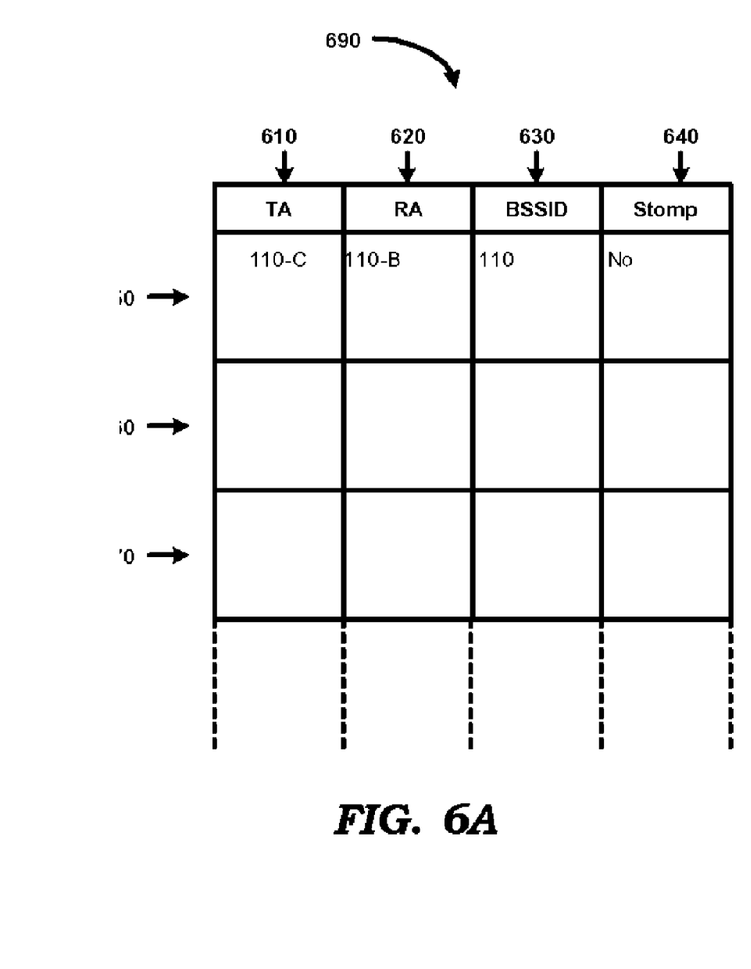
FIGS. 6A-6C are tables illustrating how a stomp table is initialized and updated in a non-intrusive learning process in one embodiment.
Figure 6B:
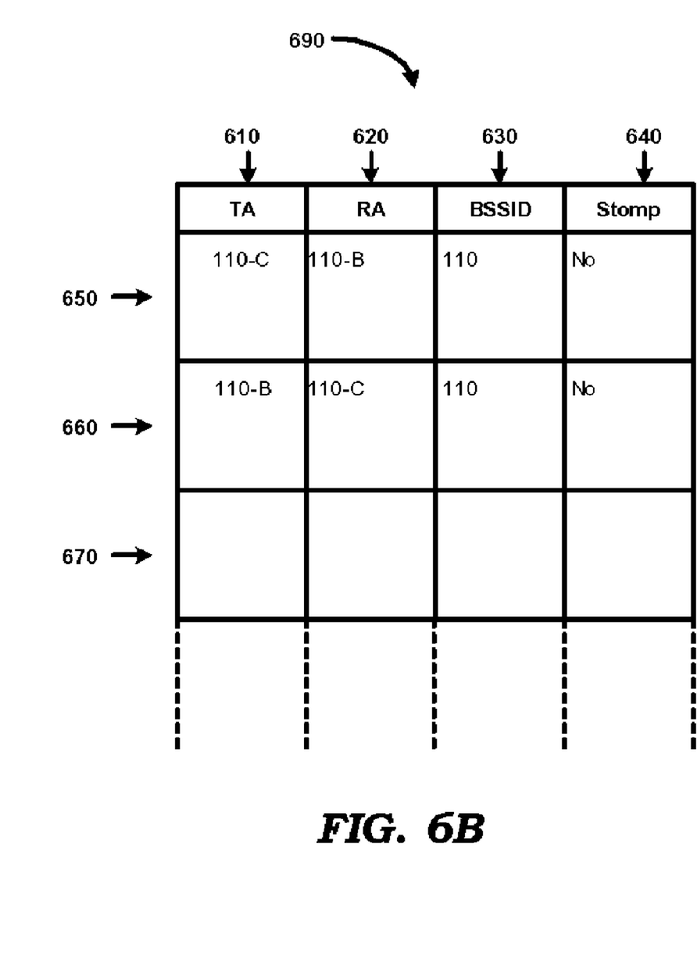
Figure 6C:
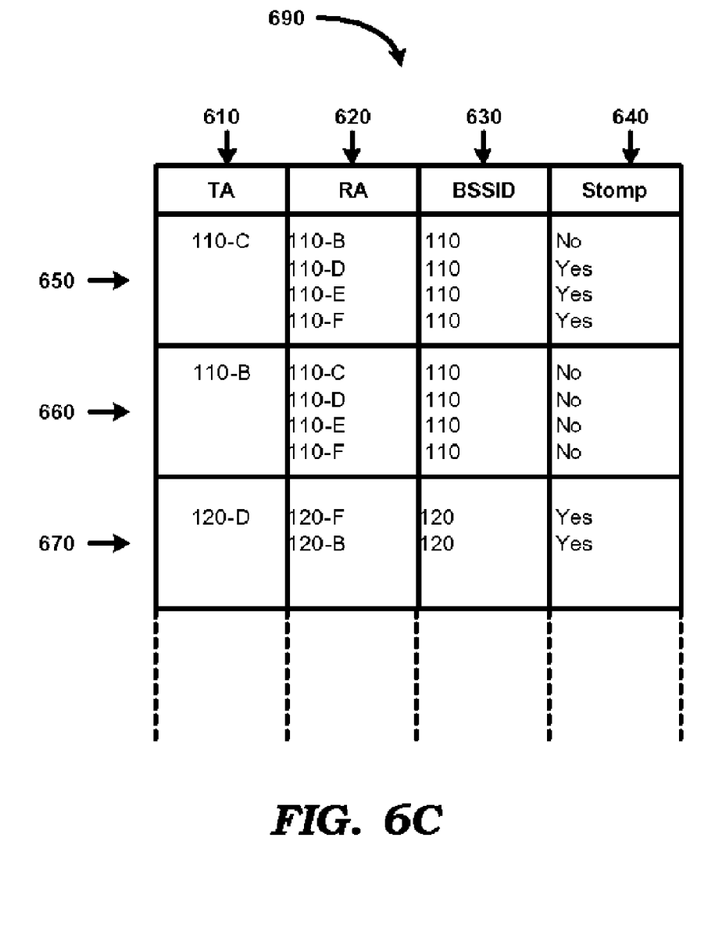

FIGS. 6A-6C illustrate how a stomp table (which may be contained in wireless device 110-A) is initialized and updated in a non-intrusive learning process. The reason the learning process illustrated with the help of FIGS. 6A-6C is termed non-intrusive will become clear from the following description.

Merely as an example, the description below is provided with respect to FIG. 1. It is assumed in the following description that the operations are performed in wireless device 110-A. It must be understood, however, that similar operations may be performed concurrently in all other wireless devices 110-B through 110-E, 120-A through 120-E, and access points AP 110-F and AP 120-F as well.

In each of FIGS. 6A-6C, stomp table 690 is shown containing columns 610 through 640, and rows 650 through 670.

Column 610 (TA) contains the address of a transmitting wireless device, column 620 (RA) contains the address of a corresponding receiving wireless device, column 630 (BSSID) contains the BSSID of the corresponding transmitting wireless device in column 610, and column 640 contains the entries/decision variables (Yes/No) for each transmitter/receiver pair which indicates if an interference that involves the corresponding transmitter/receiver pair may be ignored (stomped).

Rows 650, 660 and 670 are shown containing stomp table entries for the case when the transmitting wireless devices is 110-B, 110-C and 120-D respectively.

Entries for TA and RA (columns 610 and 620 respectively) may either be provided by a user if known, or may be entered by wireless device 110-A as it learns of the presence of other wireless devices in the environment.

For example, if wireless device 110-A notes (by listening on the channel) that wireless device 110-C is transmitting data to wireless device 110-B, transmitter address 110-C and receiver address 110-B are entered as shown by corresponding entries in row 650 of FIG. 6A. The BSSID of transmitting wireless device 110-C is entered in the corresponding column 630 as shown in FIG. 6A.

By measuring the interference power as received, wireless device 110-A may determine that transmitting wireless device 110-C is sufficiently far away. However, wireless device 110-A does not yet know the relative location (distance) of receiver wireless device 110-B (from 110-A). Therefore, wireless device 110-A cannot be sure if its own transmission will affect (or be affected by) the communication between the pair of wireless devices 110-C/110-B. Hence, a decision not to stomp over wireless device 110-C's transmission is made, and is shown as an entry "No" for the pair 110-C/110-B under column 640 of FIG. 6A (corresponding step 280 of flowchart of FIG. 2).

Accordingly, if wireless device 110-A wants to transmit, but observes that the channel is currently engaged by wireless device 110-C's transmission, a decision not to stomp (transmit in the presence of interference from wireless device 110-C) is taken. Wireless device 110-A, therefore, waits for the channel to become free (steps 550/560/570 of the flowchart of FIG. 5).

At a later point in time, if wireless device 110-A notes (by listening on the channel) that wireless device 110-B is transmitting data to wireless device 110-C, transmitter address 110-B and receiver address 110-C are entered as shown by corresponding entries in row 660 (FIG. 6B). The BSSID of transmitting wireless device 110-B is entered in the corresponding column 630 as shown in FIG. 6B.

By measuring the interference power as received, wireless device 110-A may determine that transmitting wireless device 110-B is nearby. From the earlier observation (row 650) wireless device 110-A has already determined that receiver 110-C is located relatively far away. Since one of the pair of devices (110-B) is considered not be located sufficiently far a decision not to stomp over wireless device 110-B's transmission is made, and is shown as an entry "No" for the pair 110-B/110-C under column 640 of FIG. 6B (corresponding to step 280 of flowchart of FIG. 2).

Thus, wireless device 110-A has determined that any interference due to communication between wireless devices 110-B and 110-C, will not be stomped over, i.e., wireless device 110-A will not transmit when the interference is due to communication between wireless devices 110-B and 110-C.

Over time, by observing the transmissions in the channel, wireless device 110-A can update stomp table 690 to contain "Yes/No" decision entries for each pair of devices. A partial entry is shown in FIG. 6C, where it has been further assumed as an example that devices 110-D, 110-E and AP-11OF are located sufficiently far away from wireless device 110-A (as demonstrated by corresponding rows in 650).

Wireless device 110-A may thus update and use the decision entries ("Yes/No" column 640) to determine whether to transmit or not in the presence of in-band interference involving corresponding device pairs.

It may be noted from the foregoing description that wireless device 110-A builds/updates stomp table 690 passively, i.e., by only listening to the interference, i.e., in a non-intrusive manner. Wireless device 110-A may also be configured to update stomp table 690 in an intrusive manner, as described next.

8. Intrusive Learning

Figure 7A:
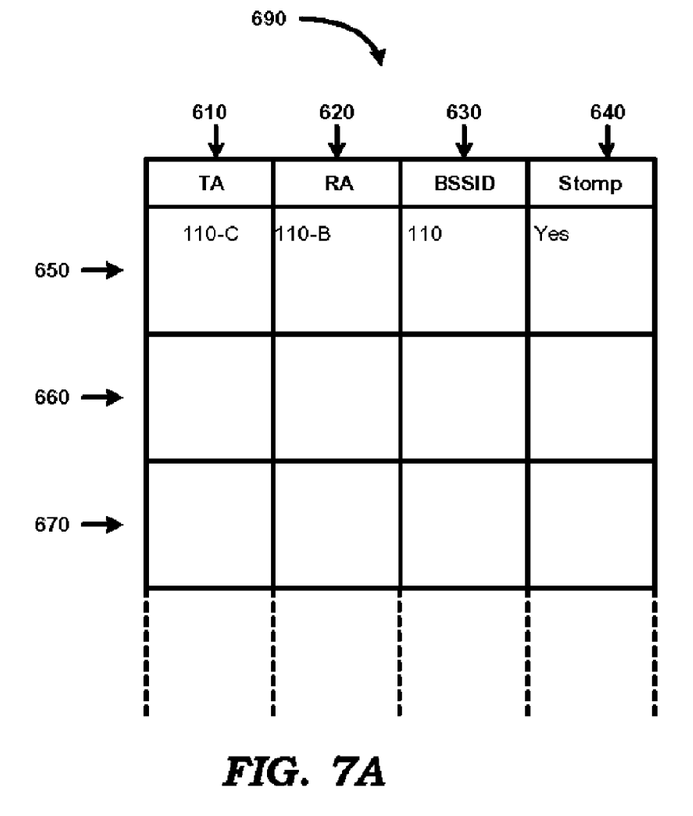
FIGS. 7A and 7B illustrate how a stomp table is initialized and updated in an intrusive learning process in one embodiment.
Figure 7B:
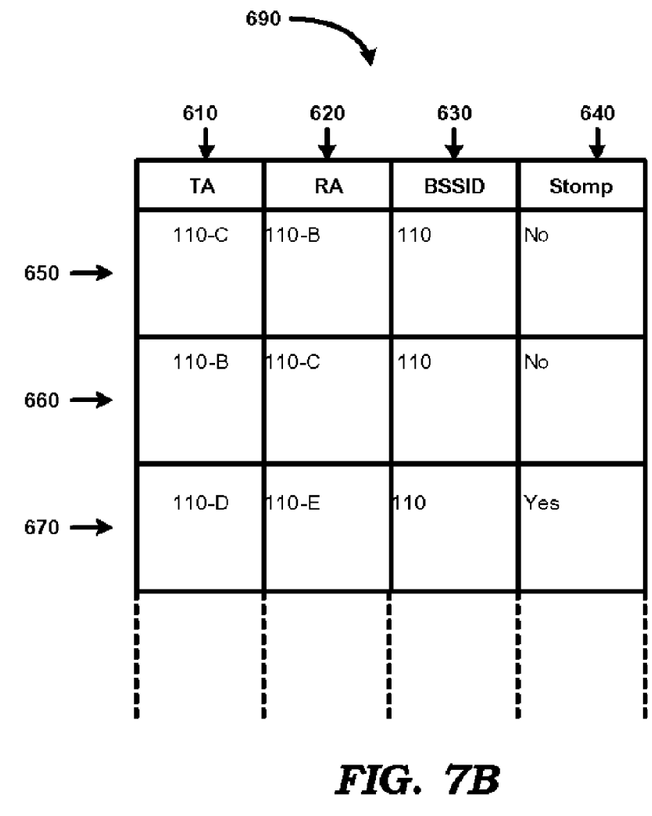

FIGS. 7A and 7B illustrate how a stomp table (which may be contained in wireless device 110-A) is initialized and updated in an intrusive learning process. The rows and columns of FIGS. 7A and 7B are entered similar to as in FIGS. 6A-6C, and the description of each entry is not repeated here.

In intrusive learning, when wireless device 110-A needs to transmit a frame but observes that in-band interference is present, wireless device 110-A initially ignores the in-band interference (provided the interference is determined to be below a pre-specified threshold) and transmits the frame.

For example, as shown in row 650 of FIG. 7A, if wireless device 110-A needs to transmit a frame but observes that in-band interference due to communication between 110-C (transmitting) and 110-B (receiving) is present, wireless device 110-A ignores this interference (provided the interference is determined to be below a pre-specified threshold) and transmits the frame as indicated by the "Yes" entry in column 640 of FIG. 7A.

If an acknowledgment to the transmitted frame is not received from the intended receiver (for example, wireless device 110-E) wireless device 110-A may determine that this may be due to the relative proximity of wireless device 110-E to wireless device 110-C. Then, wireless device 110-A updates (corrects) the corresponding decision entry in column 640 from a "Yes" to a "No", as shown in FIG. 7B.

Rows 660 and 670 are shown in FIG. 7B with entries corresponding to other device pairs. Stomp table 690 entries are updated/corrected over time as wireless device 110-A learns about the relative locations of other wireless devices in an intrusive manner, i.e., by initially ignoring in-band interference (provided the interference is determined to be below a pre-specified threshold) and stomping over (transmitting), and by correcting the decision entry based on whether an acknowledgment is received or not.

Thus, the learning process (intrusive as well as non-intrusive) described above further allows wireless device 110-A to transmit frames even in the presence of in-band interference. As the learning process evolves with time, the decision entries in stomp table 690 may become more refined to the extent that successful transmission (and reception by the intended receiver) may become possible in the presence of in-band interference without affecting communication between either transmitter-receiver pair. As may be appreciated, this may result in an overall improvement of the throughput performance of the CSMA-based network, since now more than one pair of devices may communicate concurrently on the same shared channel.

The intrusive learning process described above uses transmission of frames and reception (or no reception) of acknowledgment to make decisions regarding stomping. However, such decisions can also be made by transmission of a Request-to-Send (RTS) frame instead of a frame, and reception (or no reception) of a Clear-to-send (CTS) frame instead of an acknowledgment, as will be apparent to one skilled in the relevant arts.

It is further noted very briefly that in the moderate and aggressive configurations, the NAV (Network Allocation Vector, as defined in the WLAN standards noted above) rules may be modified as follows:

1) In the moderate configuration, NAV cannot be set by the transmission of a frame by a transmitter assigned to a different BSS, i.e., whose BSSID is different.

2) In the aggressive configuration, NAV is set on reception of a CTS frame. On receiving an RTS frame, the NAV is set to protect only the subsequent CTS frame, but not the frame and acknowledgment.

From the description provided above with respect to intrusive and non-intrusive learning, it will be apparent that a device initially configured to be in the aggressive mode, may as the learning process evolves with time, adaptively switch between the three modes—conservative, moderate and aggressive—described above.

For example, at start-up/initial operation, it is possible that a device has very little knowledge about the presence/location of other devices operating in its environment. Therefore, as a safe approach, it may be decided to operate the device in the conservative mode. As the device learns over time about the presence/location of other devices it may be switched to operate in the aggressive mode. If at some time later it is observed that stomping is becoming unsuccessful to an unacceptable level, it may be decided to switch the device back to conservative mode.

In addition, even if stomping is allowed, stomping may be permitted only for certain types of frames and/or transmission type, as described below with examples.

9. Enabling/Disabling of Stomping Based on Frame Type and Transmission Type

Frames transmitted by a device may be categorized in groups. For example, the IEEE 802.11 standard specifies three categories of frames—data frames, management frames and control frames. Further, the type of transmission may also be categorized based, for example, on the number of intended recipients. For example, the IEEE 802.11 standard specifies three categories of transmission, viz. unicast, multicast and broadcast.

Hence, in addition to the adaptive switching between stomping modes described above, stomping by a device (such as wireless device 110-A) may be enabled/disabled based on the category (type) of frame causing the interference. In general, it is desirable not to stomp when the frame presently being transmitted (causing the interference) is an important (e.g., management/control) frame. This is described further below.

As noted above, a frame transmitted (or to be transmitted) by a device (for example, wireless device 110-A) may be a data frame, a management frame or a control frame.

A data frame may be large in size and thus may constitute a larger load on the channel in terms of time taken per frame on a shared channel, while a management or a control frame may be relatively smaller in size (shorter in duration) and also occur less frequently.

Hence, wireless device 110-A may be provided with a configurable option to enable or disable stomping when the interfering frame is a management or a control frame, while data frames may be enabled by default. Thus, the more important control/management frames from another interfering device may be prevented from being overridden due to the stomping action of wireless device 110-A.

Disabling of stomping may be particularly desirable in the intrusive learning mode (described above) when the interfering frame is a control/management frame. Depending on the relative significance of the respective frame types in an operating environment, other enable/disable configurations may also be employed.

As noted above, it may also be possible to categorize the type of transmission. According to the IEEE 802.11 specification, three transmission types may be employed—unicast, multicast and broadcast. Further, each such transmission type may involve the transmission of a data packet, a management packet or a control packet.

In a unicast transmission, a frame (data, control or management) is intended for a particular recipient. For example, wireless device 110-A may transmit a unicast frame intended solely for wireless device 110-D (FIG. 1). In a unicast transmission, a transmitted frame may or may not be acknowledged by a recipient.

In a multicast transmission, a frame (data, control or management frame) is intended for more than one recipient, and a transmitted frame is not acknowledged by the receivers. In a broadcast transmission, a frame (data, control or management frame) is intended for all other wireless devices in the same BSS (as the transmitting wireless device), and a transmitted frame is not acknowledged by the receivers.

Hence, stomping may be disabled if the interfering transmission is a multicast transmission or a broadcast transmission, while stomping may be enabled if the interfering transmission is a unicast transmission. Depending on the specific operating environment and protocol, other enable/disable configurations may also be employed. Further enable/disable configurations may be provided independently with respect to frame type and transmission type.

The enable/disable feature for stomping described above, as also the adaptive switching between the stomping modes and learning modes, may be specified or changed at any point in time. The corresponding entry in a stomp table (for example, yes/no decision entry in column 640 of the stomp table shown in FIGS. 6A-7B) may be entered so as to reflect such an enable/disable feature. Alternatively, separate yes/no decision entries may be specified (not shown in Figures)for each interfreing frame type and/or transmission type for each device.

Various aspects of the invention described above may be implemented in a device in a combination of one or more of hardware, software and firmware. In general, when throughput performance is of primary consideration, the implementation is performed more in hardware (e.g., in the form of an application specific integrated circuit). When cost is of primary consideration, the implementation is performed more in software (e.g., using a processor executing instructions provided in software/firmware). Cost and performance can be balanced by the various aspects of the invention with a desired mix of hardware, software and/or firmware. An embodiment implemented substantially in software is described below.

9. Software Implementation

Figure 8:
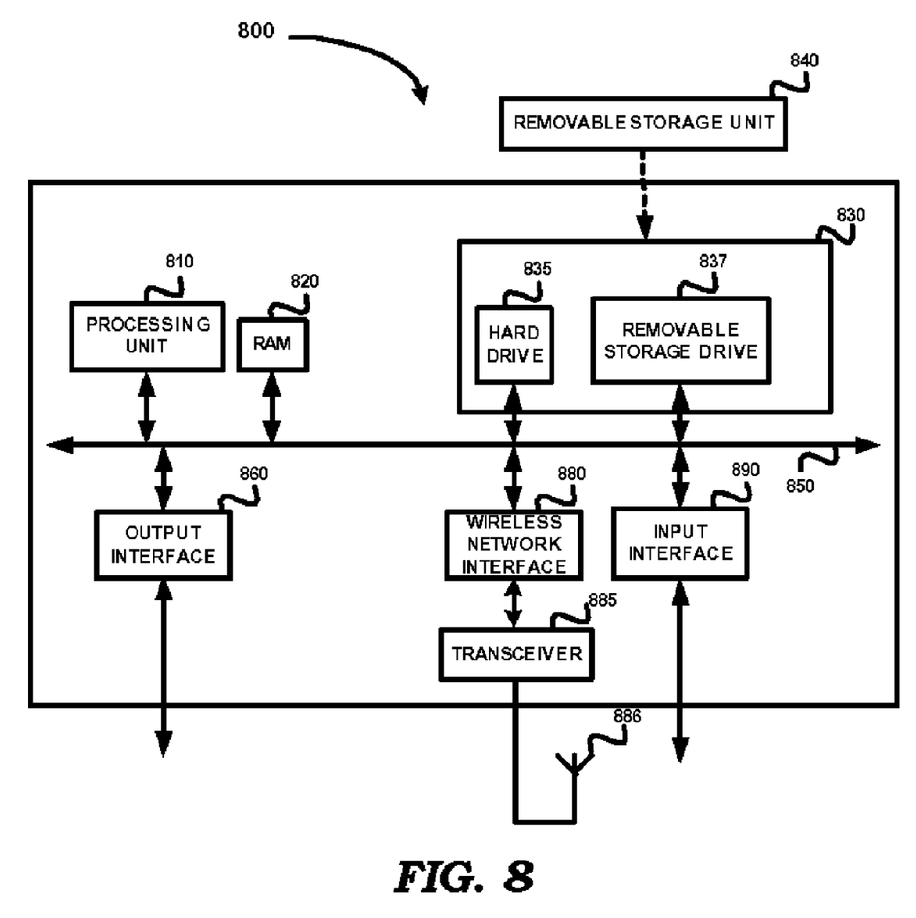
FIG. 8 is a block diagram illustrating the details of a device in an embodiment of the present invention.

FIG. 8 is a block diagram illustrating the details of a device 800 (such as wireless device 110-A or access point 110-F) in one embodiment of the present invention. Device 800 is shown containing processing unit 810, random access memory (RAM) 820, storage 830, output interface 860, wireless network interface 880, transceiver 885, antenna 886, and input interface 890. Each block is described in further detail below.

Output interface 860 provides output signals (e.g., display signals to a display unit, not shown) which can form the basis for a suitable interface for a user/administrator to configure device 800 or to interact with device 800. Input interface 890 (e.g., interface with a key-board and/or mouse, not shown) enables a user/administrator to provide any necessary inputs (e.g., initialization/configuration of device 800's transmission mode, stomp table 690, as well as specify whether stomping with respect to frame types and transmission type is to be enabled or disabled) to device 800.

Wireless network interface 880 enables device 800 to send and receive data (via transceiver 885) on the wireless communication channel as per a required specification such as WLAN (For example, WLAN specifications IEEE 802.11 a/b/g). Transceiver 885 provides the physical medium interface (e.g., RF) for transmission/reception of data to omni-directional antenna 886.Wireless network interface 880, output interface 860, input interface 890, transceiver 885 and antenna 886 may be implemented in a known way.

RAM 820 and storage 830 may together be referred to as memory. RAM 820 receives instructions and data on path 850 from storage 830, and provides the instructions to processing unit 810 for execution.

Secondary memory (storage) 830 may contain units such as hard drive 835 and removable storage drive 837. Secondary memory 830 may store the software instructions and data, which enable device 800 to provide several features in accordance with the present invention. While secondary memory 830 is shown contained within device 800, an alternative embodiment may be implemented with the secondary memory 830 implemented external to device 800, and the software instructions (described below) may be provided using wireless network interface 880.

Some or all of the data and instructions may be provided on removable storage unit 840, and the data and instructions may be read and provided by removable storage drive 837 to processing unit 810. Floppy drive, magnetic tape drive, CD_ROM drive, DVD Drive, Flash memory, removable memory chip (PCMCIA Card, EPROM) are examples of such removable storage drive 837.

Processing unit 810 may contain one or more processors. Some of the processors can be general purpose processors which execute instructions provided from RAM 820. Some can be special purpose processors adapted for specific tasks (e.g., for memory/queue management). The special purpose processors may also be provided instructions from RAM 820.

In general processing unit 810 reads sequences of instructions from various types of memory media (including RAM 820, storage 830 and removable storage unit 840), and executes the instructions to provide various features of the present invention described above with respect to FIGS. 2-5.

With combined reference to FIGS. 6A, 6B, 6C, 7A, 7B and FIG. 8, stomp table 690 may be stored in RAM 820 or in secondary memory 830. Similarly, the configuration data indicating the specific mode of transmission, and the enable/disable configuration with respect to frame type and/or transmission type may also be stored in RAM 820 or secondary memory 830, and retrieved via RAM 820 during operation.

10. Conclusion

While various embodiments of the present invention have been described above, it should be understood that they have been presented by way of example only, and not limitation. Thus, the breadth and scope of the present invention should not be limited by any of the above described embodiments, but should be defined only in accordance with the following claims and their equivalents.

What is claimed is:

1. A method of improving throughput performance in a first network providing connectivity to a first plurality of devices, said first plurality of devices capable of communicating with each other over a shared communication channel, said method being implemented in a first device contained in said first plurality of devices, said method comprising:

forming a frame to transmit over said shared communication channel;

determining whether there is in-band interference in said shared communication channel in preparation to transmit;

learning intrusively using transmission of frames and reception or non reception of acknowledgement or no acknowledgement to make a plurality of stomping table entries in a stomp table;

checking whether a configuration data is equal to a first value, wherein said transmitting is performed only if said configuration data is not equal to said first value, said checking further checks whether a strength of said in-band interference on said shared communication channel is below a pre-specified threshold, wherein said transmitting is performed only if said strength of said in-band interference is below said pre-specified threshold, said checking still further checks whether frames being transmitted by a second device causing said in-band interference to indicate that said second device is assigned to said first network, wherein said transmitting is performed if said second device is determined to be assigned to a different network;

adaptively switching a stomping mode from amongst a plurality of stomping modes on repeated learning based on said stomping table entries;

ascertaining whether said second device and said third device are located outside of a distance range from said first device, said ascertaining comprises:

recording in a stomp table contained in said first device the addresses of said second device and said third device;

recording in said stomp table a basis service set identification BSSID of said second device;

determining a strength of said in-band interference as received at said first device; and initially storing in said stomp table said decision variable that specifies that said first device transmit said frame in the presence of said in-band, and wherein said decision variable is updated at a later time point to specify that said first device not transmit said frame in the presence of said in-band interference if an acknowledgment to said transmit is not received; and transmitting said frame on said shared communication channel without artificially reducing a receive sensitivity even if said in-band interference is determined to be present, wherein said transmitting is performed if both said second device and said third device are outside of said distance range.

2. A method of improving throughput performance in a first network providing connectivity to a first plurality of devices, said first plurality of devices capable of communicating with each other over a shared communication channel, said method being implemented in a first device contained in said first plurality of devices, said method comprising:

forming a frame to transmit over said shared communication channel;

determining whether there is in-band interference in said shared communication channel in preparation to transmit;

learning intrusively using transmission of frames and reception or non reception of acknowledgement or no acknowledgement to make a plurality of stomping table entries in a stomp table;

checking whether a configuration data is equal to a first value, wherein said transmitting is performed only if said configuration data is not equal to said first value, said checking further checks whether a strength of said in-band interference on said shared communication channel is below a pre-specified threshold, wherein said transmitting is performed only if said strength of said in-band interference is below said pre-specified threshold, said checking still further checks whether frames being transmitted by a second device causing said in-band interference to indicate that said second device is assigned to said first network, wherein said transmitting is performed if said second device is determined to be assigned to a different network;

adaptively switching a stomping mode from amongst a plurality of stomping modes on repeated learning based on said stomping table entries;

ascertaining whether said second device and said third device are located outside of a distance range from said first device, said ascertaining comprises:

recording in a stomp table contained in said first device the addresses of said second device and said third device;

recording in said stomp table a basis service set identification BSSID of said second device;

determining a strength of said in-band interference as received at said first device; and initially storing in said stomp table a decision variable that specifies that said first device not transmit said frame in the presence of said in-band interference and specifying whether or not to transmit in the presence of said in-band interference caused by transmission from said second device to said third device, and wherein said decision variable is updated at a later time point to specify that said first device transmit said frame in the presence of said in-band interference if entries in said stomp table at said later time point indicate so; and transmitting said frame on said shared communication channel without artificially reducing a receive sensitivity even if said in-band interference is determined to be present, wherein said transmitting is performed if both said second device and said third device are outside of said distance range.

3. The method of claim 2, wherein said decision variable is updated if said ascertaining ascertains that at each of said second device and said third device is located outside of said distance range from said first device at said later time point.

4. The method of claim 3, wherein said decision variable is updated at a further later time point if it is ascertained at said further later time point that at least one of said second device and said third device is not located outside of said distance range from said first device at said further later time point.

5. The method of claim 4, wherein said decision variable is configurable to specify whether said first device transmit said frame or not if said in-band interference is caused by transmission of a first type, and wherein said decision variable always specifies that said first device transmit said frame if said in-band interference is caused by transmission of a second type.

6. The method of claim 5, wherein said first type is a control frame or a management frame and said second type is a data frame.

7. The method of claim 5, wherein said first type is a unicast transmission and said second type is a broadcast or multicast transmission.

8. A device operating in a first network, said first network providing connectivity to a first plurality of devices, said first plurality of devices capable of communicating with each other over a shared communication channel, said device being contained in said first plurality of devices, said device comprising:

a memory for storing at least one stomp table created by intrusive learning using transmission of frames and reception or non reception of acknowledgement or no acknowledgement to create a plurality of stomping table entries in a stomp table;

a transceiver; and a processor configured to:

adaptively switch a stomping mode from amongst a plurality of stomping modes on repeated learning based on said stomping table entries;

form a frame to transmit over said shared communication channel;

determine whether there is in-band interference in said shared communication channel in preparation to transmit said frame;

cause said transceiver to transmit said frame on said shared communication channel even if said in-band interference is determined to be present without artificially reducing a receive sensitivity;

retrieve said configuration data from said memory;

transmit said frame only if said configuration data is not equal to a first value;

waiting for said in-band interference to stop before transmitting said frame if said configuration data is equal to said first value;

check whether an interference level on said shared communication channel is below a pre-specified threshold, wherein said transmitting is performed only if said interference level is below said pre-specified threshold;

check whether frames being transmitted by a second device causing said in-band interference indicate that said second device is assigned to said first network, wherein said transmitting is performed if said second device is determined to be assigned to a different network;

determine that said second device is transmitting to a third device to cause said in-band interference, said processor further ascertaining whether said second device and said third device are located outside of a pre-determined distance range from said device, wherein said transmitting is performed if both said second device and said third device are outside of said pre-determined distance range, wherein each entry indicates whether said device can transmit frames when said in-band interference is caused by transmissions between a corresponding pair of devices and, wherein said each entry is configurable to specify whether said processor transmit said frame or not if said in-band interference caused by transmissions between said corresponding pair of devices is of a first type, and wherein said each entry always specifies that said processor transmit said frame if said in-band interference caused by transmissions between said corresponding pair of devices is of a second type.

9. The device of claim 8, wherein said first type is a control frame or management frame and said second type is a data frame.

10. The device of claim 8, wherein said first type is a unicast transmission and said second type is a broadcast or multicast transmission.

11. The method of claim 1, wherein the plurality of stomping modes comprising conservative; moderate; and aggressive.

12. The method of claim 8, wherein the plurality of stomping modes comprising conservative; moderate; and aggressive.

* * * * *